United States Patent
Arumugham et al.

(10) Patent No.: US 7,328,287 B1
(45) Date of Patent: Feb. 5, 2008

(54) SYSTEM AND METHOD FOR MANAGING I/O ACCESS POLICIES IN A STORAGE ENVIRONMENT EMPLOYING ASYMMETRIC DISTRIBUTED BLOCK VIRTUALIZATION

(75) Inventors: Kalaivani Arumugham, Sunnyvale, CA (US); Santosh Rao, Santa Clara, CA (US); Gopal Sharma, San Jose, CA (US); Poonam Dhavale, Sunnyvale, CA (US); Randy Shingai, San Jose, CA (US); Ronald S. Karr, Sunnyvale, CA (US); Oleg Kiselev, Palo Alto, CA (US); Shie-Rei Huang, Saratoga, CA (US)

(73) Assignee: Symantec Operating Corporation, Cupertino, CA (US)

( * ) Notice: Subject to any disclaimer, the term of this patent is extended or adjusted under 35 U.S.C. 154(b) by 500 days.

(21) Appl. No.: 10/899,201

(22) Filed: Jul. 26, 2004

(51) Int. Cl.
*G06F 13/00* (2006.01)
*G06F 15/16* (2006.01)
*G06F 15/167* (2006.01)

(52) U.S. Cl. .............................. 710/31; 710/6; 710/33; 711/100; 711/162; 709/203; 709/205; 709/213; 709/216

(58) Field of Classification Search ............. 710/6, 710/31, 33; 711/100, 162; 709/203, 205, 709/213, 216
See application file for complete search history.

(56) References Cited

U.S. PATENT DOCUMENTS

| | | | |
|---|---|---|---|
| 6,216,202 | B1 | 4/2001 | D'Errico |
| 6,275,892 | B1 | 8/2001 | Arnott |
| 6,574,705 | B1 | 6/2003 | Peloquin et al. |
| 6,594,698 | B1 | 7/2003 | Chow et al. |
| 6,606,651 | B1 * | 8/2003 | Linde .......................... 709/216 |
| 6,745,207 | B2 | 6/2004 | Reuter et al. |
| 6,944,732 | B2 * | 9/2005 | Thunquest et al. ......... 711/162 |

OTHER PUBLICATIONS

"Fibre Channel SAN Security", Clark, Elizabeth, http://www.networkmagazine.com/shared/article/showArticle.jthml?articleId=8703406, pp. 1-5, Sep. 4, 2002.
"LUN Masking in a SAN," King, Bill, Qlogic Corporation, pp. 1-12, Oct. 8, 2001.

* cited by examiner

*Primary Examiner*—Tammara Peyton
(74) *Attorney, Agent, or Firm*—Meyertons Hood Kivlin Kowert & Goetzel, P.C.; B. Noël Kivlin

(57) ABSTRACT

A system employing asymmetric distributed block virtualization includes a volume server, a plurality of volume clients, and one or more physical block devices. The volume server aggregates storage in the physical block devices into a logical volume and makes the logical volume accessible to the volume clients for input/output (I/O) operations. In order to manage different I/O access requirements (such as read-only access versus read-write access) of the volume clients, the volume server maintains a different I/O access policy for each volume client to control the kinds of input/output operations that the volume client is allowed to perform on the logical volume.

23 Claims, 9 Drawing Sheets

Configuration Database Entry For I/O Access Policy →

| Volume Client ID | Volume ID | I/O Access Policy | | |
|---|---|---|---|---|
| | | Access Permission | I/O Mode | Validity Period |
| VC1 | V1 | RW | Direct | 3600 sec. |

FIG. 4

Config. Database 510 →

| Volume Client ID | Volume ID | I/O Access Policy | | |
|---|---|---|---|---|
| | | Access Permission | I/O Mode | Validity Period |
| VC1 | V1 | RW | Direct | 3600 sec. |
| VC1 | V3 | RO | Direct | 3600 sec. |
| VC2 | V1 | RO | Direct | 3600 sec. |
| VC2 | V3 | RO | Indirect | 1800 sec. |
| VC3 | V2 | ER | Direct | 3600 sec. |
| VC4 | V4 | EW | Direct | 7200 sec. |

FIG. 5

Volume Client 600     Cache 610

| Volume ID | Access Policy |
|---|---|
| V601 | AP601 |
| V602 | AP602 |
| V603 | AP603 |

FIG. 6

| Volume Client ID | Volume ID | Address Range | I/O Access Policy | | |
|---|---|---|---|---|---|
| | | | Access Permission | I/O Mode | Validity Period |
| VC1 | V1 | 0-10000 | RW | Direct | 3600 sec. |
| VC1 | V1 | 20000-30000 | RO | Direct | 3600 sec. |
| VC2 | V1 | 5000-10000 | RO | Direct | 3600 sec. |
| VC2 | V3 | 30000-50000 | RO | Indirect | 1800 sec. |
| VC3 | V2 | 0-100000 | ER | Direct | 3600 sec. |
| VC4 | V4 | 0-72000 | EW | Direct | 7200 sec. |

SYSTEM AND METHOD FOR MANAGING I/O ACCESS POLICIES IN A STORAGE ENVIRONMENT EMPLOYING ASYMMETRIC DISTRIBUTED BLOCK VIRTUALIZATION

BACKGROUND OF THE INVENTION

1. Field of the Invention

This invention relates to computer systems and, more particularly, to management of input/output operations in storage environments employing asymmetric distributed block virtualization techniques.

2. Description of the Related Art

Many business organizations and governmental entities rely upon applications that access large amounts of data, often exceeding a terabyte or more of data, for mission-critical applications. Often such data is stored on many different storage devices, which may be centrally located or distributed throughout an enterprise. Such storage devices may be heterogeneous in nature, including many different types of devices from many different manufacturers.

Configuring individual applications that consume data, or application server systems that host such applications, to recognize and directly interact with each different storage device that may possibly be encountered in a heterogeneous storage environment would be increasingly difficult as the environment scaled in size and complexity. Therefore, in some storage environments, specialized storage management software and hardware may be used to provide a more uniform storage model to storage consumers. Such software and hardware may also be configured to add storage features not present in individual storage devices to the storage model. For example, features to increase fault tolerance, such as data mirroring, snapshot/fixed image creation, or data parity, as well as features to increase data access performance, such as disk striping, may be implemented in the storage model via hardware or software.

However, not all data consumers may require or benefit from the same types of features that might be presented by the storage model. Likewise, not all data consumers may require the same kind of access to the same data. For example, an on line transaction processing application may require fast update and read capabilities to a set of data, while a background analysis or data mining application may require only read access to the same set of data. Further, some types of applications may require a high degree of data reliability but are not particularly performance sensitive, while the reverse may be true of other applications. Requiring that all data consumers be provided the same storage functionality (such as mirroring, striping, snapshots, etc.) and/or that data be available in a uniform manner to each consumer in a complex storage environment may potentially result in suboptimal use of resources.

SUMMARY OF THE INVENTION

Various embodiments of a system for managing input/output (I/O) access policies in a storage system employing asymmetric distributed block virtualization are disclosed. In one embodiment, the system includes a volume server, a plurality of volume clients, and one or more physical block devices. The volume server aggregates storage in the physical block devices into a logical volume and makes the logical volume accessible to the volume clients for input/output operations. The volume clients may require different types of access to the logical volume; for example, one client may need to read and update data on the logical volume, while a second client may only need to perform read operations. The physical connectivity between the two clients and the physical block devices may differ; for example, one client may have direct fiber-channel connectivity to the physical block devices allowing direct access, while the other may not have direct connectivity, but may require the volume server to perform I/O operations on its behalf. In order to manage such distinct access requirements, the volume server uses a different I/O access policy for each volume client for the logical volume, controlling the kinds of input/output operations that the volume client is allowed to perform on the logical volume.

In one specific embodiment, each I/O access policy may include a different access permission; for example, one of the volume clients may be permitted to perform both read and write operations, while another may be permitted only read access on the same logical volume. In another embodiment, the two I/O access policies may differ in the initial destination to which an I/O request is directed by the volume clients: for example, one volume client may be allowed to use a direct I/O mode (where the client may access a physical storage device directly to perform read and write operations), while another volume client may be allowed to use an indirect I/O mode (where the volume client sends an I/O request to the volume server, and the volume server performs the requested operation on the storage device and sends a response back to the volume client). In another embodiment, the I/O access policies provided to volume clients may differ in both access permission and I/O mode.

Several other embodiments are also disclosed. In one contemplated embodiment, the system includes a volume server, a plurality of volume clients, and one or more physical block devices, where the volume server aggregates storage in the physical block devices into two logical volumes. The volume server makes the first logical volume accessible to the first volume clients for input/output operations using a first I/O access policy, and makes the second logical volume accessible to the second volume client using a second I/O access policy different from the first. In yet another embodiment, a volume server makes two logical volumes accessible to one volume client, and accesses from the volume client to the first logical volume are managed using one I/O access policy, while accesses from the volume client to the second logical volume are managed using a second, distinct I/O access policy.

BRIEF DESCRIPTION OF THE DRAWINGS

FIG. 4 illustrates an example of a configuration database entry for an I/O access policy for one specific embodiment.

FIG. 5 shows an example of a set of I/O access policy entries for various logical volumes and volume clients in a configuration database according to one embodiment.

FIG. 6 is a block diagram illustrating an example of a cache maintained by a volume client in one embodiment, containing encodings of I/O access policies.

Figure 1:
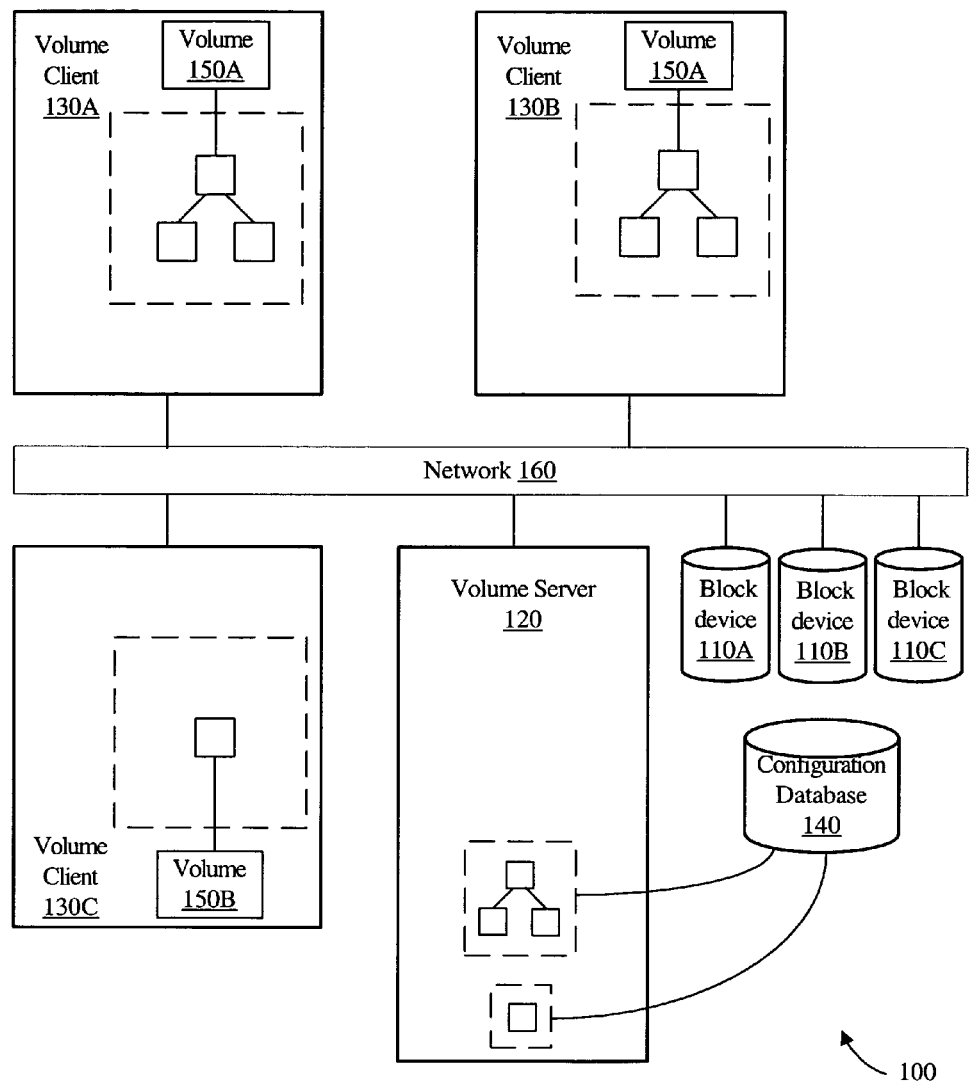
FIG. 1 is a block diagram illustrating one embodiment of a logical volume-based block virtualization system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates a logical volume-based block virtualization system 100 according to one embodiment. In the illustrated embodiment, system 100 includes a plurality of block devices 110A-C (collectively, block devices 110) as well as a volume server 120 and a plurality of volume clients 130A-C (collectively, volume clients 130), coupled to a network 160. Volume clients 130 may also be referred to herein as hosts 130. Volume server 120 is configured to have access to configuration information in a configuration database 140. Volume clients 130A and 130B are shown as having access to a volume 150A. That is, each of volume clients 130A may request or perform input/output (I/O) operations on volume 150A. Volume 150A is associated with one or more logical storage objects, illustrated as a tree of logical objects. Volume client 130C is shown as having access to a volume 150B. As illustrated, different volume clients 130 may have access to different sets of volumes 150; not all volume clients need access to the same volumes. Further discussion of the manner in which different sets of volumes may be distributed among volume clients is provided below.

Generally speaking, a block device 110 may comprise a hardware or software entity that provides a collection of linearly addressed data blocks that can be read or written. For example, in one embodiment a block device 110 may be a single disk drive configured to present all of its sectors as an indexed array of blocks. It is contemplated that any suitable type of storage device may be configured as a block device, such as fixed or removable magnetic media drives (e.g., hard drives, floppy or Zip-based drives), writable or read-only optical media drives (e.g., CD or DVD), tape drives, solid-state mass storage devices, or any other type of storage device. Block devices presented by physical storage devices may also be referred to as physical block devices. In some embodiments, a physical block device may be presented by a storage device residing on a storage network, such as a Small Computer System Interface (SCSI) device presented to a Storage Area Network (SAN) using a Fibre Channel, Infiniband, or Internet Protocol (IP) interface. In some embodiments, a block device 110 may also be a logical or virtual storage device resulting from a mapping of blocks of one or more physical storage devices, as described in greater detail below. Such block devices may also be referred to as logical or virtual block devices.

Hardware devices configured to provide a collection of linearly addressed data blocks may generally be referred to as physical block devices, and logical or virtual storage devices so configured may generally be referred to as logical or virtual block devices. It is contemplated that in some embodiments, data blocks may be uniformly sized across different physical and logical block devices, while in other embodiments physical and logical block devices may employ different block sizes. It is also contemplated that in some embodiments, block sizes may vary among particular physical block devices and/or particular logical block devices, or even within a given block device.

A block device may differ from a file in that it may not require use of a file system for access; that is, a consumer of a block device 110 may read or write blocks directly to the device, bypassing any file system that may be in use. In some embodiments, a block device 110 presented by an operating system for use by a consumer may present relatively few primitives through which the device may be manipulated. For example, in one embodiment a block device 110 may support open, close, read and write primitives, plus a few miscellaneous control and query primitives. In contrast, file systems may provide a richer set of primitives, such as support for creating and removing files, appending to files, creating and removing directories, etc. Typical interfaces to block devices may allow for higher raw throughput and greater concurrency than typical interfaces to single files of a file system. Block devices 110 that are physical storage devices, such as disks or tape drives, may be configured to present some form of SCSI interface, though other interfaces are possible and contemplated.

A volume manager, such as volume server 120, may introduce virtualization of blocks, creating some number of virtualized block devices out of one or more physical or logical block devices. (In some embodiments, physical storage devices such as disk arrays may also be configured to perform block virtualization.) In one embodiment of block virtualization, one or more layers of software and/or hardware rearrange blocks from one or more block devices, such as disks, and add various kinds of functions. The resulting rearranged collection of blocks may then be presented to a block device consumer, such as an application or a file system, as one or more aggregated devices with the appearance of one or more basic disk drives. That is, the more complex structure resulting from rearranging blocks and adding functionality may be presented as if it were one or more simple arrays of blocks, or logical block devices. It is noted that a virtualized block device may also be referred to as a logical block device, and that in some embodiments, multiple layers of virtualization may be implemented. That is, one or more block devices may be mapped into a particular virtualized block device, which may be in turn mapped into still another virtualized block device, allowing complex storage functions to be implemented with simple block devices.

In various embodiments, block virtualization can support the creation of virtualized block devices implementing numerous different types of storage functions. For example, in one embodiment a virtualized block device may implement device striping, where data blocks may be distributed among multiple physical or logical block devices, and/or device spanning, in which multiple physical or logical block devices may be joined to appear as a single large logical block device. In some embodiments, virtualized block devices may provide mirroring and other forms of redundant data storage, the ability to create a snapshot or static image of a particular block device at a point in time, and/or the ability to replicate data blocks among storage systems connected through a network such as a local area network (LAN) or a wide area network (WAN), for example. Additionally, in some embodiments virtualized block devices may implement certain performance optimizations, such as load distribution, for example, and/or various capabilities for online reorganization of virtual device structure, such as online data migration between devices. Block virtualization may provide any or all of these capabilities in a fashion transparent to virtualized block device consumers. That is, virtualized block devices may appear as generic storage devices to consumers such as file systems and applications.

Generally speaking, a volume 150A or 150B (collectively referred to as volumes 150) may comprise a virtualized block device that may be presented directly for use by a block device consumer, i.e., a file system or an application (such as a database application, for example) that can directly use block devices. Volumes 150 may also be referred to herein as logical volumes. A given volume 150 may be associated with several logical or physical block devices as a result of the block device virtualization just described. Each block device included in the logical organization of a given volume or virtualized block device may be referred to as a storage object or logical storage object. As noted previously, a given virtualized block device may include multiple layers of virtualization, depicted in FIG. 1 as a tree of storage objects.

A volume may differ from a block device interface implemented in a hardware device or that is accessed through a system disk driver, in that the latter block devices may not present a system-independent block device interface that can be opened for direct use by a consumer. Instead, a system-dependent disk driver may be required to access such block devices. Such a disk driver may be generally unaware of block virtualization and may in some instances present a barrier to using some virtualization techniques, whereas a volume implementing various block virtualization features may be directly accessible by a consumer without the issues presented by such disk drivers.

Volume server 120 (which may also be referred to herein as a virtualization coordinator or a volume coordinator) may provide functions such as configuration management of virtualized block devices and distributed coordination of block device virtualization. For example, in one embodiment volume server 120 may be aware of the type and quantity of physical storage devices, such as block devices 110, that are available within system 100. In response to a request to configure a virtual block device, for example according to a desired set of virtualization features, volume server 120 may be configured to build a volume description that describes how a collection of storage objects compliant with the desired features maps to underlying physical block devices. The volume description identifying a particular volume 150 may be distributed to one or more volume clients 130. In one embodiment, such a volume description may be a tree of storage objects as illustrated in FIG. 1 and described in greater detail below in conjunction with the description of FIG. 2.

Figure 2:
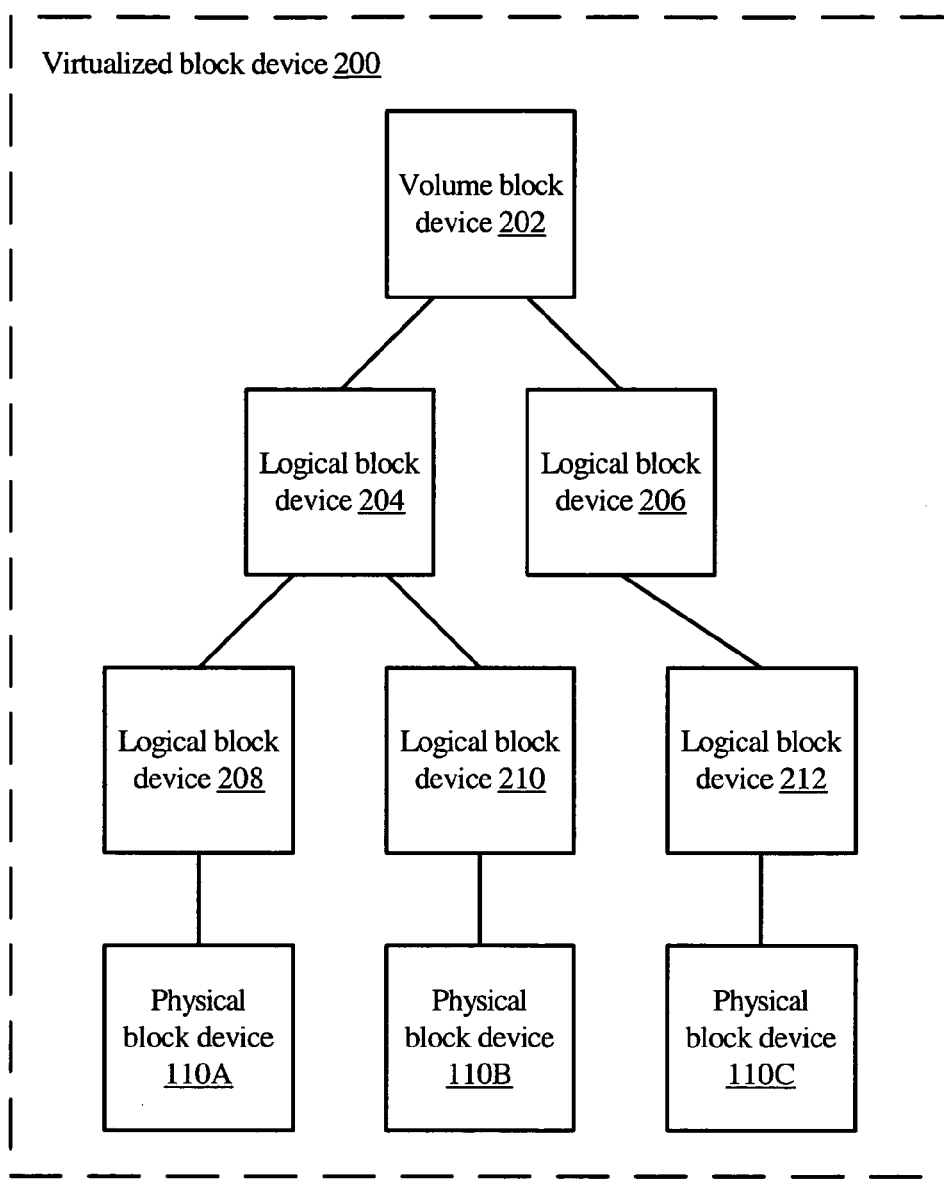
FIG. 2 is a block diagram illustrating one embodiment of a virtualized block device that may be presented as a volume.

The structure of the volume 150, for example as indicated by its corresponding storage object tree, may indicate to a given volume client 130 how the volume relates to one or more underlying physical storage devices. One embodiment of a virtualized block device that may be presented as a volume 150 to a volume client 130 is illustrated in FIG. 2. In the illustrated embodiment, virtualized block device 200 includes a volume block device 202 that includes logical block devices 204 and 206. In turn, logical block device 204 includes logical block devices 208 and 210, while logical block device 206 includes logical block device 212. Logical block devices 208, 210, and 212 map to physical block devices 110A-C of FIG. 1, respectively.

Virtualized block device 200 may in its entirety represent the structure of the data comprising a given volume 150, which data may be physically stored in physical block devices 110A-C. Volume block device 202 may be configured to be mounted within a file system or presented to an application or other volume consumer as the interface through which the consumer may interact with given volume 150. Each block device that maps to or includes another block device may include an interface whereby the mapping or including block device may interact with the mapped or included device. For example, this interface may be a software interface whereby data and commands for block read and write operations is propagated from lower levels of the virtualization hierarchy to higher levels and vice versa.

Additionally, a given block device may be configured to map the logical block spaces of subordinate block devices into its logical block space in various ways in order to realize a particular virtualization function. For example, in one embodiment, virtualized block device 200 may be configured as a mirrored volume, in which a given data block written to virtualized storage device 200 is duplicated, and each of the multiple copies of the duplicated given data block are stored in respective block devices. In one such embodiment, volume block device 202 may be configured to receive an operation to write a data block from a consumer of corresponding volume 150. Volume block device 202 may duplicate the write operation and issue the write operation to both logical block devices 204 and 206, such that the block is written to both devices. In this context, logical block devices 204 and 206 may be referred to as mirror devices. In various embodiments, volume block device 202 may read a given data block stored in duplicate in logical block devices 204 and 206 by issuing a read operation to one mirror device or the other, for example by alternating devices or defaulting to a particular device. Alternatively, volume block device 202 may issue a read operation to multiple mirror devices and accept results from the fastest responder.

As described above and shown in FIG. 2, in some embodiments a virtualized block device 200 may employ multiple layers of virtualization. For example, in the embodiment described above where logical block devices 204 and 206 function as mirror devices, it may be the case that underlying physical block devices 110A-C have dissimilar performance characteristics; specifically, devices 110A-B may be slower than device 110C.

In order to balance the performance of the mirror devices, in one embodiment, logical block device 204 may be implemented as a striped device in which data is distributed between logical block devices 208 and 210. For example, even- and odd-numbered blocks of logical block device 204 may be mapped to logical block devices 208 and 210 respectively, each of which may be configured to map in turn to all or some portion of physical block devices 110A-B respectively. In such an embodiment, block read/write throughput may be increased over a non-striped configuration, as logical block device 204 may be able to read or write two blocks concurrently instead of one. Numerous striping arrangements involving various distributions of blocks to logical block devices are possible and contemplated; such arrangements may be chosen to optimize for various data usage patterns such as predominantly sequential or random usage patterns.

In another aspect illustrating multiple layers of block virtualization, in one embodiment physical block device 110C may employ a different block size than logical block device 206. In such an embodiment, logical block device 212 may be configured to translate between the two physical block sizes and to map the logical block space define by logical block device 206 to the physical block space defined by physical block device 110C. In some instances, the logical block space of logical block device 212 need not be contiguously mapped to blocks of physical block device 110C; an arbitrary mapping may be used.

Numerous other possible configurations of block devices are contemplated that may incorporate more or fewer layers of virtualization to realize within a given instance of virtualized block device 200 virtualization functions similar to or different from those described above. For example, volume block device 202 may employ a greater number of mirror devices, striping may occur higher in the hierarchy than mirroring, certain logical block devices may be configured to perform snapshots of other devices, certain logical block devices may span multiple physical block devices, etc. Distribution of a virtualized block device as a volume to one or more clients may be referred to as distributed block virtualization.

A variety of configuration management functions may be provided by volume server 120 to volume clients 130. In the embodiment shown in FIG. 1, configuration management functions provided by volume server 120 include the management of I/O access policies for volumes 150. The term "I/O access policy", as used herein, refers to a set of rules describing the manner in which a specific volume client is allowed to access a given volume for I/O operations. In the embodiment shown in FIG. 1, the volume server 120 stores an entry representing an I/O access policy for a given specific volume 150 and a given specific volume client 130 in configuration database 140. Further details regarding configuration database entries are provided below.

In general, I/O access policies may include a variety of rules. In one embodiment, one rule included in an I/O access policy relates to an access permission limiting the types of input/output operations (reads and/or writes) volume clients 130 are allowed to perform on a given volume 150. For example, an I/O access policy for a given volume 150 and a given volume client 130 may include Read-Only (RO), Read-Write (RW), Exclusive Read (ER), or Exclusive Write (EW) access permission. If an I/O access policy for a given volume client 130A and given volume 150A includes Read-Only access permission, volume client 130A may perform only read operations on volume 150A. If Read-Write access permission is included in the I/O access policy, volume client 130A is allowed to perform read and/or write operations on volume 150A. If the I/O access policy gives client 130A Exclusive Write access permission to volume 150A, no volume client other than 130A may write to volume 150A, although one or more clients including 130A may read from volume 150A. If Exclusive Read access permission is provided to volume client volume 150A, no volume client including 130A may write to volume 150A, but one or more volume clients including 130A may read from volume 150A. Other different combinations of read and write access permissions and exclusivities may also be used in different implementations.

Figure 3A:
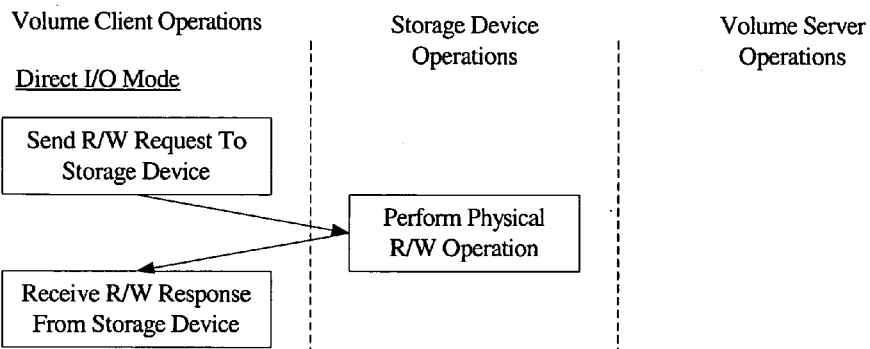
FIGS. 3a, 3b and 3c show an example of the operation of three I/O modes used in one embodiment of the block virtualization system.
Figure 3B:
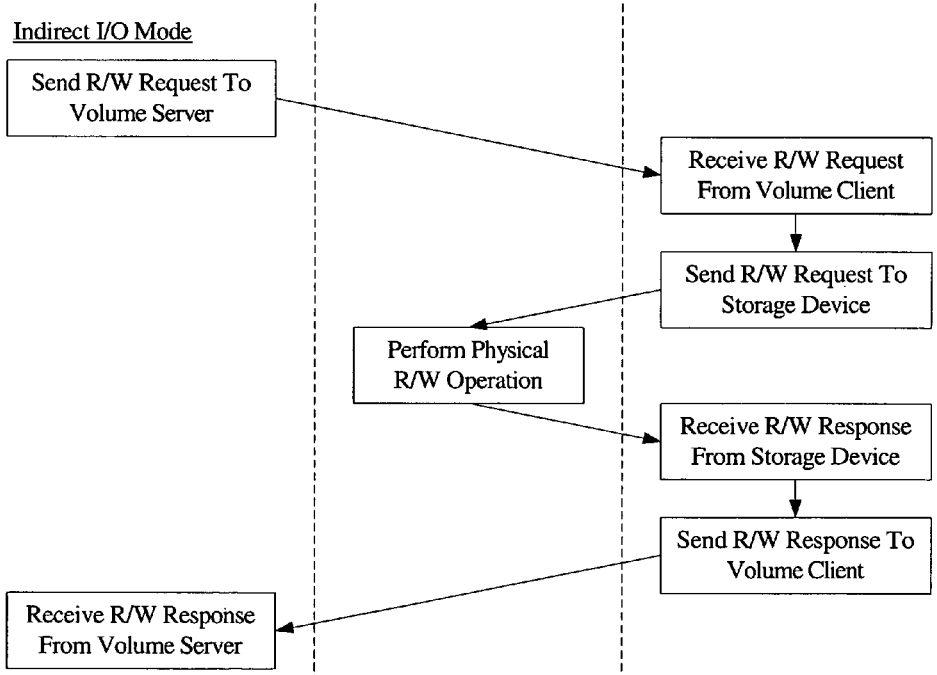
Figure 3C:
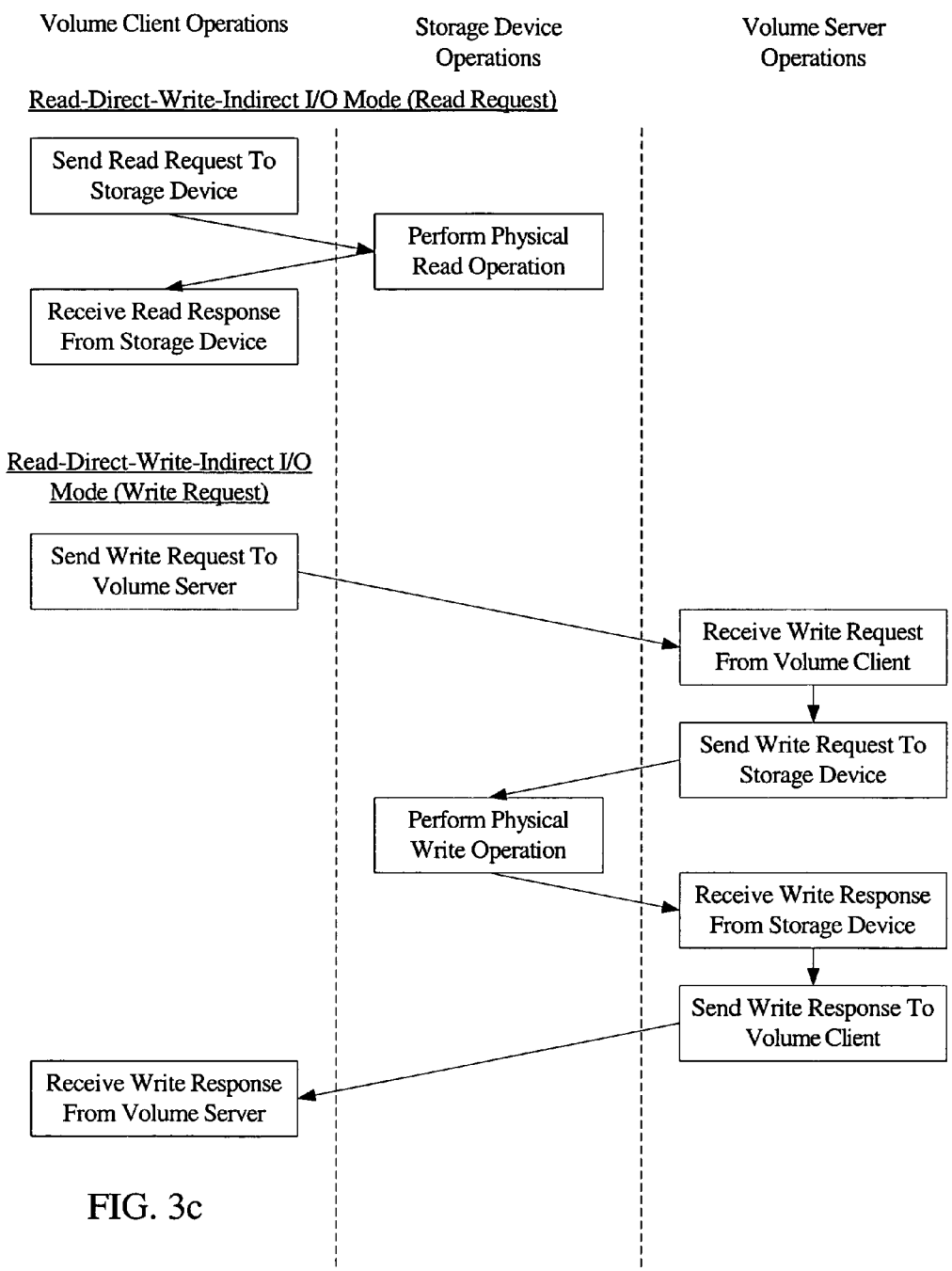

In another embodiment, an I/O access policy may also include a specific I/O mode, where an I/O mode is a rule that determines a destination to which a read request or a write request may be initially directed by a volume client. In one embodiment, as described below, an I/O access policy may include one of three I/O modes: direct I/O mode, indirect I/O mode, and read-direct-write-indirect I/O mode. FIGS. 3a-3c show examples of the operation of these three I/O modes for one specific embodiment. For each of the three I/O modes, a sequence of operations is shown, performed at a volume client 130, a storage device such as block device 110, and a volume server 120.

In direct I/O mode, after volume server 120 has distributed a volume description or layout of a given virtual block device to a given volume client 130 as a particular volume 150, volume client 130 may interact with volume 150 to read and write blocks directly, without further involvement on the part of volume server 120. Thus, volume client 130 may use the structure of volume 150 to transform I/O requests generated by various consumers of volume 150 into I/O requests directed to specific physical storage devices, such as block devices 110. As shown in FIG. 3a, volume client 130 sends a read or write (R/W) request to storage device 110; the physical read or write operation is performed at storage device 110, and a response to the read or write operation is received at the volume client from storage device 110. Direct I/O may be used, for example, if volume client 130 has direct connectivity through fiber channel or any other specific network implementation to the specific storage device or devices containing the data represented by the particular volume. Direct I/O operations may also be performed on cached copies of data from the volume that reside at the volume client in some embodiments; that is, some I/O requests may be satisfied without accessing a storage device over a network connection in direct I/O mode.

In indirect I/O mode, as illustrated in FIG. 3b for one embodiment, volume client 130 may send a request to read or write blocks of a volume 150 to volume server 120. Volume server 120 may receive the request from volume client 130, and send a corresponding request to perform the requested operation to storage device 110 on behalf of volume client 130. The physical read or write operation may be performed at storage device 110, and results of the operation returned to volume server 120. Volume server 120 may receive the results and send them on to volume client 130. A volume client 130 may be configured to use this indirect mode of I/O for a variety of reasons. In some embodiments, a particular volume client 130 may have no direct connectivity to a specific storage device 110, while volume server 120 may be directly connected to the specific storage device. In some implementations a volume client 130 may have connectivity to the required storage device 110, but there may be load constraints on the network connectivity between volume client 130 and the storage device that make the use of an alternative path desirable. In other implementations, for example, security-related constraints may require that I/O requests from volume client 130 be handled by a trusted intermediary server such as volume server 120. In one embodiment, volume server 120 may designate an intermediary server (for example, a different volume server or volume client) for indirect I/O originating from a specific volume client 130. Volume client 130 may, in such an embodiment, route I/O requests via the intermediary server instead of routing them via volume server 120. Volume server 120 may also be configured to dynamically change the designated intermediary server in such embodiments. Indirect I/O mode may also be implemented using more than one intermediary server in some embodiments, for example, where volume server 120 forwards an I/O request to another server, and the other server performs the physical input/output operation on a storage device and returns a response to volume server 120. Multiple levels of such indirection are also possible in some embodiments, wherein a plurality of other servers are used as intermediaries in a similar manner.

In read-direct-write-indirect mode, as illustrated in FIG. 3c for one embodiment, read requests from a given volume client 130 to a given volume 150 are treated differently from write requests from the same volume client to the same volume. Read requests from volume client 130 use a direct I/O mode as described above, while write requests are handled using an indirect I/O mode as described above. Read-direct-write-indirect mode may be used, for example, in an environment where volume server 120 or some other server is responsible for maintaining replicated copies of a specific volume, and the server responsible for maintaining the replicated copies has direct connectivity to the storage devices used for the various replicated copies, while volume client 130 has direct connectivity to only a subset of the replicated copies.

In general, I/O access policies may include other rules in addition to the access permissions and I/O modes described above. As described in more detail below, I/O access policies may also include validity periods in some embodiments. In other embodiments, where some applications running on a specific volume client 130 have a greater importance or otherwise require better I/O performance than applications running on other volume clients, an I/O access policy may also incorporate a notion of priority. A high-priority volume client 130 may, in such embodiments, need to have its I/O requests for a given volume 150 handled prior to pending I/O requests from low-priority volume clients.

As stated earlier, in one embodiment volume server 120 may store an entry representing an I/O access policy for a given specific volume 150 and a given specific volume client 130 in configuration database 140. An example of a configuration database entry for an I/O access policy is shown in FIG. 4 for one embodiment. The entry contains a volume client identifier ("VC1"), a volume identifier ("V1"), and representations of the elements making up the I/O access policy. In the illustrated example, the I/O access policy has three elements: an access permission (RW), an I/O mode (Direct), and a validity period (3600 seconds). In other embodiments, the database entry may include other elements such as a priority as described above. It is noted that FIG. 4 shows the logical structure of a configuration database entry, and that the entry may be physically implemented using a variety of techniques. For example, the information contained in the entry may be stored in data structures at some level of storage software in system 100, in an operating system, or it may be managed in a separate database. In some embodiments, configuration database 140 may be stored in persistent storage, which may be attached to volume server 120 directly or may be attached to a configuration server distinct from volume server 120. Elements of the entry may be physically maintained separately: for example, there may be one data structure for access permissions and another data structure for maintaining access modes.

In some embodiments of system 100, volume server 120 may be configured to distribute all virtualized block devices as volumes 150 to each volume client 130 within the system. Each volume client may be provided connectivity to all physical storage devices, such as devices 110. Identical I/O access policies may be used for a given volume 150 to each volume client 130. Such embodiments may be referred to as symmetric distributed block virtualization systems. However, not all volume clients 130 may require identical I/O access policies to access a given volume 150.

In a complex environment, several volume clients, each running a different application, may require different types of access to a given volume. The types of I/O operations required may differ from application to application, thus requiring different access permissions at different volume clients. The connectivity desired between different volume clients and a given volume may differ: for example, it may be impractical to provide fiber channel connectivity to all volumes to thousands of volume clients, where many of the volume clients had low expected I/O rates to some of the volumes. The relative priorities of applications accessing a given volume, where the applications run on different volume clients, may also differ as described above. In response to these conditions and for other reasons, it may be desirable to use different I/O access policies to control access by different volume clients 130 to a given volume 150. The different I/O access policies may differ from one another in access permission, I/O mode, priority, or any other constituent element or combination of elements.

In one embodiment, for example, where two volume clients 130A and 130B access a given volume 150, an I/O access policy for volume client 130A may include a first access permission, and an I/O access policy for volume client 130B may include a second access permission that differs from the first access permission. If, for example, an online transaction processing (OLTP) application runs on volume client 130A, and the OLTP application manipulates data residing in volume 150A, volume client 130A may need to perform both read and write operations on volume 150A. In such a case, volume client 130A's I/O access policy for volume 150A may include Read-Write (RW) access permission as described above. A report-generating application, for a second example, may be running on client 130B while the OLTP application is running on volume client 130A, where the report-generating application needs to periodically summarize and report on data residing on volume 150A, but does not need to update any data on volume 150A. In such a case, volume client 130B's access policy for volume 150A may include Read-Only access, and applications on volume client 130B may not be allowed to update or create data residing on volume 150A, thus preventing inadvertent data corruption or other security lapses. In another embodiment, an access policy for volume client 130A for volume 150A may differ from an access policy for volume client 130B for volume 150A in I/O mode, while access permissions included in the two I/O access policies may be identical. In yet another embodiment, an I/O access policy for volume client 130A for volume 150A may differ in both access permissions and I/O modes from an I/O access policy for volume client 130B for volume 150A. Furthermore, in an embodiment where a given volume client 130N accesses more than one volume, an access policy for volume client 130N to access a volume 150N may differ in access permission, I/O mode, or other constituents from an access policy for volume client 130N to access another volume 150P.

In FIG. 5, six I/O access policy entries are shown in an example of a configuration database 510 illustrating the use of different access I/O policies for various combinations of volumes 150 and volume clients 130 in one embodiment. The access policy for volume client VC1 to access volume V1 in the example shown includes RW access permission, a direct I/O mode, and a validity period of 3600 seconds. The access policy for volume client VC2 to access volume V1 includes RO (Read-Only) access permission, direct I/O mode, and a validity period of 3600 seconds. I/O access policy entries are also shown for four other combinations of volume clients and volumes.

Encodings of I/O access policies such as those shown in FIG. 5 may be cached at volume clients 130 in one embodiment. Caching I/O access policies at volume clients may help reduce the workload of a volume server 120. If each I/O request made by a volume client 130 had to validated by volume server 120, I/O performance may be degraded as the number of volume clients increased, or as the number of I/O operations requested by a given set of volume clients increased. FIG. 6 is a block diagram illustrating a cache 610 maintained by a volume client 600 containing encodings of I/O access policies AP601, AP602 and AP603 for volumes V601, V602, and V603 accessed by volume client 600. Cache 610 may be maintained using any suitable data structure, for example in a hash table keyed by volume identifier, a tree, etc. Cache 610 may be maintained in any specific volatile storage, or in any specific persistent storage at the volume client.

As described above, for a variety of reasons it may be desirable to use different I/O access policies for different volume clients accessing the same volume 150. The use of different I/O access policies for two volume clients 130 to access a given volume 150 thus represents one kind of asymmetry in a distributed block virtualization environment. Generally speaking, several kinds of asymmetry are possible in implementing distributed block virtualization. For example, in one embodiment, different volume clients such as 130A and 130C may have access to different logical volumes 150A and 150B. In such an embodiment, an access policy for volume client 130A to access volume 150A may differ in access permission, I/O mode, or other constituents from an access policy for volume client 130C to access volume 150B. Thus there may be an asymmetry not only in the set of volumes that two volume clients may access, but also in the kinds of I/O operations the volume clients may perform on the volumes that they may access. It is noted that distributed block virtualization systems also may be considered asymmetric in terms of how the virtualization is controlled. That is, in a system that is asymmetric in the control sense, the management of block virtualization that is performed by volume server 120 may be distinctly separated from input/output (I/O) activity to the virtualized block devices, such as performed by volume clients 130. For example, volume server 120 may be a completely separate system from volume clients 130 as illustrated in FIG. 1. By contrast, in a system that is symmetric in the control sense, one of the client systems configured to perform I/O to a virtualized block device may also be configured to manage block virtualization on behalf of the other client systems.

Figure 7:
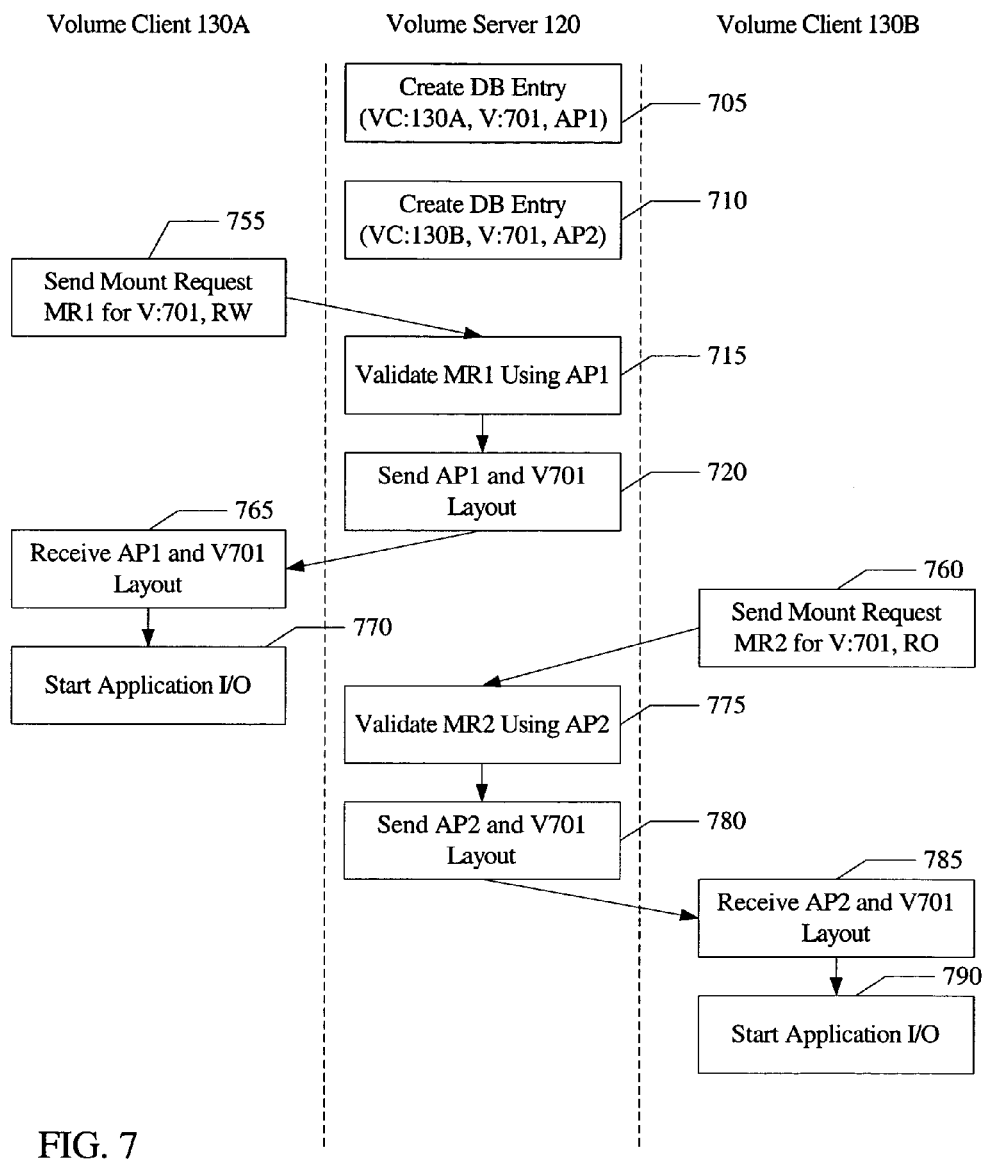
FIG. 7 illustrates a sequence of operations performed at a volume server and two volume clients to create and manage I/O access policies in one embodiment.

A variety of techniques may be used to create and manage I/O access policies in computer system 100. In one embodiment, an I/O access policy for a given volume client 130 and a given volume 150 may be created or initialized in response to a configuration command issued to volume server 120. Volume server 120 may create an entry in configuration database 140, as mentioned above, for the I/O access policy. Once the I/O access policy has been set up, volume client 130 may obtain the I/O access policy from volume server 120 using a variety of interfaces (for example in response to a mount request issued by volume client 130), and may cache the I/O access policy as described above, before applications on volume client 130 may begin I/O operations on the volume. FIG. 7 illustrates a sequence of operations performed at a volume server 120 and two volume clients 130A and 130B to implement this functionality in one such embodiment.

In box 705 of FIG. 7, an I/O access policy AP1 may be created for volume client 130A for a volume 701 and stored in configuration database 140 by volume server 120. A second I/O access policy AP2 may be created for volume client 130B for volume 701 and also stored in configuration database 740, as shown in box 710. Volume client 130A may send a mount request MR1 (box 755) to volume server 120 for volume 701, where the mount request may, for example, include a mount option for applications on volume client 130A to be able to perform read and write operations on volume 701. Volume server 120 may validate MR1 using AP1 (box 715) (for example, it may check whether an access permission in I/O access policy AP1 allows the kinds of operations requested by volume client 130A). On finding MR1 valid, volume server 120 may send a representation or encoding of the access policy AP1 and the layout of volume 701 to volume client 130A (box 720). (A response of volume server 120 to invalid mount requests, where, for example, volume client 130A requests Exclusive Write (EW) access, while AP1 only allows RO access, is not illustrated in FIG. 7; such mount requests may result access being denied to volume client 130A). Upon receiving the encoding of AP1 and the layout of volume 701 (box 765), volume client can begin allowing applications to perform I/O operations to volume 701 in accordance with AP1, as shown in box 770. Similarly, volume client 130B may send a mount request MR2 to volume server 120, as shown in box 760, requesting permission for read operations on volume 701. Volume client 120 may validate MR2 using AP2 (box 775), and if the mount request is found valid, may then send an encoding of access policy AP2 and a layout of volume 701 to volume client 130B (box 780). Volume client 130B may receive the encoding of AP2 and the layout of volume 701 (box 785), and start application I/O to volume 701 in accordance with AP2 (box 790).

As described above, a cached copy of an I/O access policy may be used by a volume client 130 to perform I/O operations on a volume 150, without any interactions with a volume server 120. A need to change an I/O access policy may arise from time to time due to a number of factors, as described in more detail below. If a change is made to an I/O access policy at a volume server 120, the corresponding entry in configuration database 140 is updated, and the change must also eventually be reflected in the cached copy at the volume client 130. Depending on the kind of change made, the changed I/O access policy may need to be communicated immediately to volume client 130, or it may be possible to delay notification. Synchronization between configuration database 140 and cached I/O access policies at volume clients 130 may be accomplished using a number of mechanisms. In one embodiment, an I/O access policy may include an associated validity period that may be used to periodically verify that a cached copy of an I/O access policy matches a corresponding entry in configuration database 140. For example, a specific I/O access policy for a volume client 130 for a given volume 150 may be configured with a validity period set to 3600 seconds (one hour). Upon expiration of the validity period, the I/O access policy may have to be validated by volume server 120. Further details of the interaction between volume client 130 and volume server 120 in response to an expiration of a validity period of an I/O access policy for one embodiment are provided in conjunction with the description of FIG. 9 below.

Figure 8:
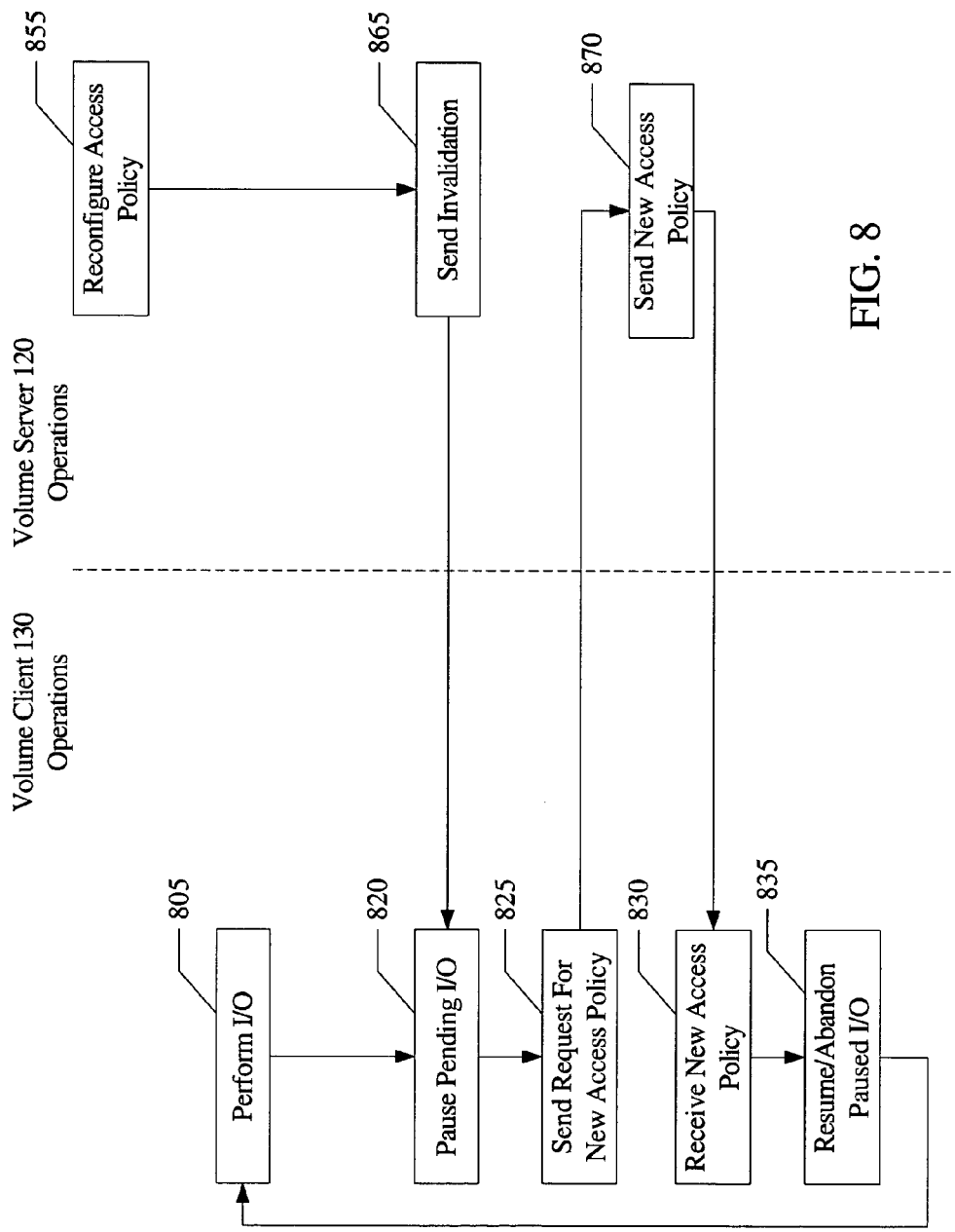
FIG. 8 shows operations performed at a volume server and a volume client in one embodiment in response to a command to reconfigure an I/O access policy.

As stated above, from time to time an I/O access policy may need to be modified. For example, in some implementations, volume server 120 may be configured to periodically gather usage statistics for various volume clients 130 and volumes 150, and the statistics may be used to adjust I/O permissions to optimize overall performance of system 100. I/O access policies may also need to be modified based on business considerations such as an expiration of a contract in an environment where access to storage is leased to customers. In one embodiment, volume server 120 may be configured to change an I/O access policy for a given volume 150 and a given volume client 130A dynamically, that is, without taking volume 150A offline. I/O operations pending on volume 150A from volume clients other than 130A may continue unaffected during the modification of the I/O access policy. I/O operations pending on volume 150A from volume client 130A at the time of the change in the I/O access policy may be placed in a paused state temporarily, as described in greater detail below. In one embodiment, volume server 120 may modify an I/O access policy in response to a reconfiguration command, as illustrated in FIG. 8. In an embodiment where an I/O access policy has a validity period, volume server 120 may also be able to modify the I/O access policy when the validity period expires, as illustrated in FIG. 9.

FIG. 8 shows operations performed at volume server 120 and volume client 130 in one embodiment in response to a command to reconfigure an I/O access policy. In box 805, volume client 130 performs I/Os as part of normal operation prior to the reconfiguration. Box 855 shows volume server 120 receiving a command to reconfigure a given I/O access policy. Such a command, for example a command to change an access permission from RW to RO, may be issued by a system administrator using any of a variety of interfaces such as a graphical user interface (GUI) or a command line tool. The reconfiguration command may be part of an operation where the layout of a volume 150 is being changed, or the I/O access policy may be changed independently of any layout changes. Upon receiving the command, volume server 120 may update an entry in configuration database 140 for the I/O access policy, and may send a message invalidating the I/O access policy to volume client 130 (box 865). On receiving the invalidation message, volume client 130 may invalidate a cache entry for the I/O access policy and place any pending I/O operations to volume 150 in a paused state (box 820). Volume client 130 may then send a request for a new access policy (box 825) to volume server 120; in response, volume server 120 may send a new I/O access policy (box 870) to volume client 130. If the reconfiguration command had been issued in conjunction with a change to the layout of the volume, the new I/O access policy may be accompanied by a new layout. On receiving the new access policy (box 830), volume client 130 may modify an entry in its I/O access policy cache, and resume a subset of the I/O operations that were earlier placed in a paused state, where the resumed I/O operations are allowed by the new access policy. For example, if the original I/O access policy included read and write (RW) access permission to volume 150, and the new I/O access policy includes read-only (RO) access permission, any pending read requests that may have been paused may be resumed. A subset of paused I/O operations may have to be abandoned by volume client 130, if they are no longer allowed under the new I/O access policy. For example, if the change was from RW access permission to RO, and the paused I/O operations included write operations, the write operations may be abandoned. After resuming and/or abandoning paused I/O operations, volume client 130 may continue to perform I/O operations using the new I/O access policy, as shown in box 805.

Figure 9:
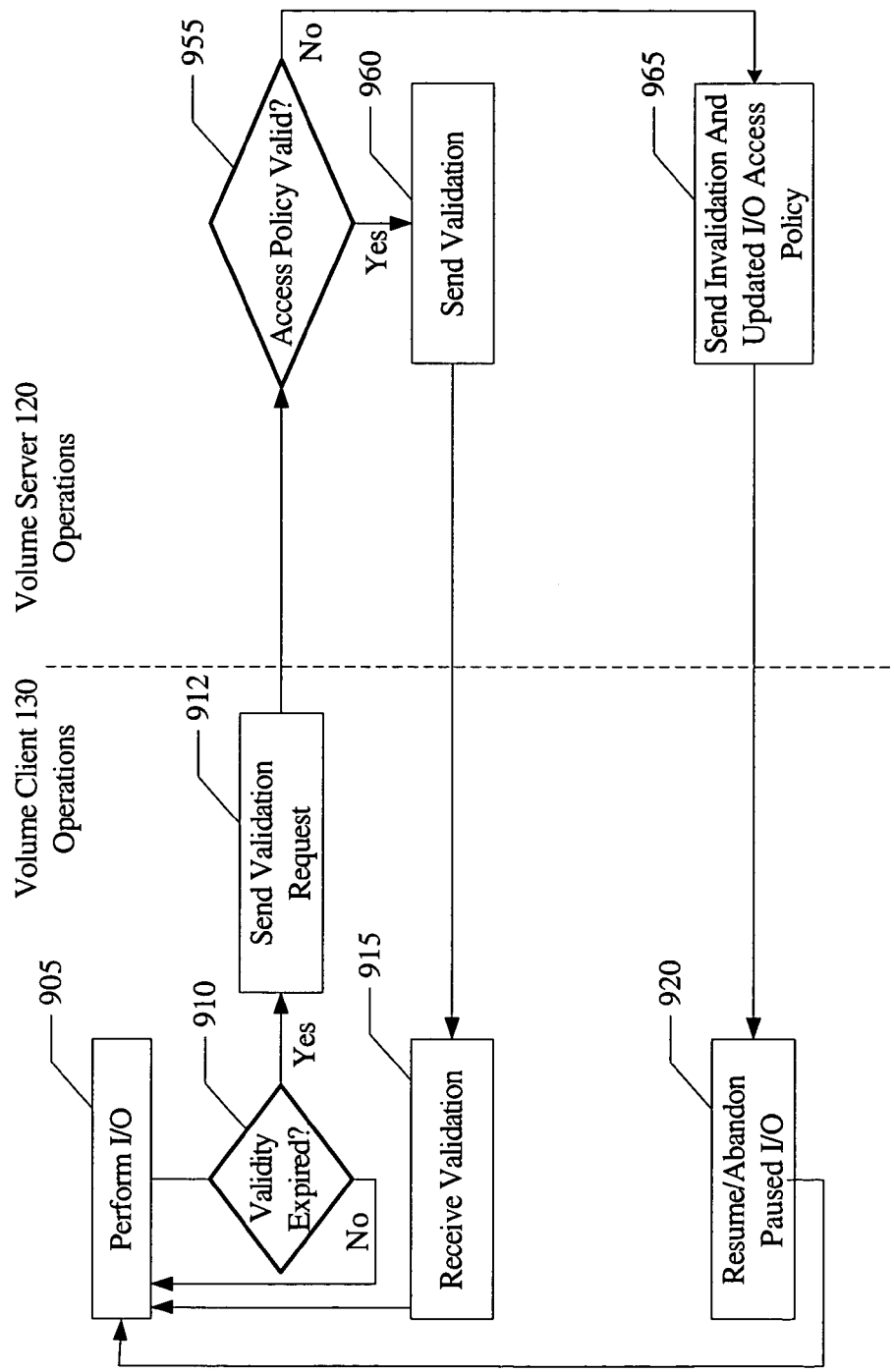
FIG. 9 shows operations performed at a volume server and a volume client in one embodiment in response to an expiration of a validity period of an I/O access policy.

FIG. 9 illustrates a sequence of operations that may be performed at a volume client 130 and a volume client 120, related to expiration of a validity period of a specific I/O access policy in one embodiment. In box 905, volume client 130 performs I/Os as part of normal operation prior to the reconfiguration. Volume client 130 may periodically check whether the validity period has expired (decision box 910). If the validity has not expired, volume client 130 may continue I/O operations. If the validity period has expired, volume client 130 may send a validation request for the I/O access policy to volume server 120 (box 912). Volume server 120 determines whether the I/O access policy remains valid, as shown in decision box 955. Volume server 120 may determine that the I/O access policy should remain in effect, in which case volume server 120 may send a validation message to volume client 130 (box 960). Alternatively, volume server 120 may determine that the I/O access policy may no longer be valid, in which case an invalidation message may be sent to volume client 130 along with an updated I/O access policy (box 965). The decision as to whether an I/O access policy should be re-validated or invalidated on the expiration of a validity period may be made based on a variety of factors in different embodiments. For example, such decisions may be made by system administrators in response to receiving notifications of validity expirations in some embodiments. In other embodiments, volume server 120 may be configured to execute software that maintain statistics on the use of the volume by the volume client (such as how many I/Os have been performed over the last 24 hours, for example) and the decision may be based on recent usage statistics criteria, or other criteria, encoded in the software.

If volume server 120 sends a validation message to volume client 130 as shown in box 960, volume client may receive the validation message (box 915) continue I/O operations. If volume server 120 sends an invalidation message and an updated I/O access policy as shown in box 965, volume client 130 may abandon pending I/Os to the volume 150 that may not be allowed under the updated access policy (for example, pending write operations may be abandoned if an access permission had changed from RW to RO in the updated I/O access policy). After abandoning any disallowed I/O operations, volume client 130 may continue I/O operations as shown.

It is noted that reconfigurations and validity period expirations for I/O access policies may be managed in several different ways in different embodiments. For example, a volume server may initiate the validity checking process, instead of a volume client as described above. Volume server 120 may periodically check whether an I/O access policy has expired, and if it has, volume server 120 may send an invalidation message to volume client 130 as described above. In other embodiments, timers provided by an operating system may be configured to notify volume client 130 or a volume server 120 when an I/O access policy expires. Further, some of the steps shown in FIG. 8 and FIG. 9 may be combined or rearranged in some embodiments. For example, an invalidation message may be combined with a new I/O access policy in some cases in response to some kinds of reconfiguration operations, instead of using separate messages for sending an invalidation notification and for sending an updated I/O access policy.

Figures 10, 11:
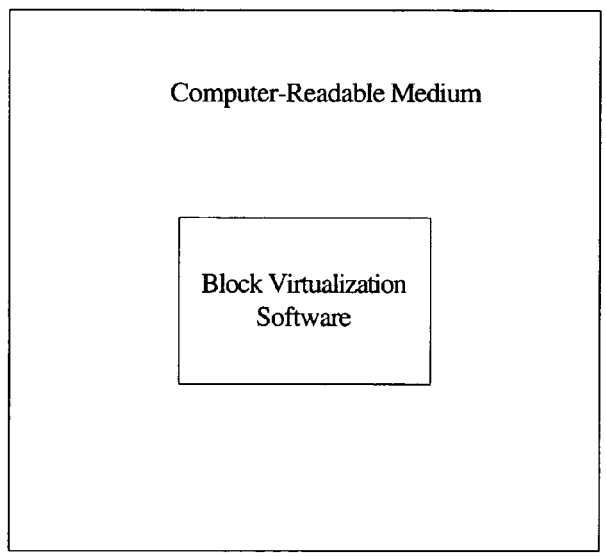
FIG. 10 shows an example of configuration database entries for I/O access policies where each entry includes a logical address range representing a subset of a logical volume.
FIG. 11 shows one embodiment of a computer-accessible medium comprising block virtualization software instructions.

For some environments, it may be desired to associate different access permissions, I/O modes and other elements of an I/O access policy with portions of a volume rather than with entire volumes. Such fine-grained use of I/O access policy may be desired in cases where a given volume may contain a large amount of data, and where various consumers of the data on the volume may have different access requirements for subsets of the data on the volume. The techniques described above for volume-level management of I/O access policies may be extended to cover such subsets of volume data. In one embodiment, a portion of a volume 150 may be associated with an I/O access policy for a given volume client 130. FIG. 10 shows an example of configuration database entries where each entry includes a logical address range representing a portion of a logical volume 150. For example, volume client VC1 has RW access permission on address range 0-10000 of volume V1, and RO access permission on address range 20000-30000 of volume V1. Volume client VC2 has RO access permission on address range 5000-10000 of volume V1. It is noted that the units in which logical addresses are expressed, and the manner in which logical addresses map to physical storage locations, may vary in different implementations. In some implementations, for example, addresses may be expressed in a unit (such as 512 bytes) corresponding to physical block sizes on the underlying physical disks.

In general, volume clients 130 may be any type of device capable of interacting with a given volume 150 for data storage and retrieval. For example, in one embodiment a volume client 130 may be a server computer system, including one or more processors and one or more system memories, where the server system is configured to execute software such as one or more operating systems and/or applications. In another embodiment, a volume client 130 may be a client computer system configured to access a given volume 150 via a separate server computer system. In other embodiments, a volume client 130 may be an embedded system configured to use application specific integrated circuit (ASIC) or field-programmable gate array (FPGA) technology to execute operations whereby a given volume 150 may be accessed. Numerous other configurations of volume clients 130 are possible and contemplated. Additionally, in some embodiments it is contemplated that the function of volume server 120 may be implemented via one or more of volume clients 130, whereas in other embodiments volume server 120 may be implemented via hardware distinct from volume clients 130.

FIG. 11 shows one embodiment of a computer-accessible medium comprising block virtualization software instructions, which, when executed, accomplish the functionality of volume server 120 and volume client 130 described above. Generally speaking, the computer-accessible medium may include storage media such as magnetic or optical media such as RAM (e.g., SDRAM, RDRAM, SRAM, etc.), ROM, etc., as well as transmission media or signals such as electrical, electromagnetic or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
a volume server;
a first and a second volume client; and
one or more physical block devices;
wherein the volume server is configured to:
aggregate storage in the one or more physical block devices into a logical volume;
make the logical volume accessible to the first volume client using a first I/O access policy;
make the logical volume accessible to the second volume client using a second I/O access policy;
wherein the first I/O access policy differs from the second I/O access policy;
wherein the volume server is further configured to maintain an entry in a configuration database for each of the first and second volume clients, wherein the entry associates a particular I/O access policy with a given logical volume;
wherein in response to a reconfiguration command, the volume server is further configured to update one or more entries in the configuration database and send an invalidation message for the first I/O access policy to the first volume client;
wherein, in response to the invalidation message, the first volume client is further configured to place pending I/O operations to the logical volume in a paused state and send a request for an updated I/O access policy to the volume server.

2. The system as recited in claim 1,
wherein in response to the request for an updated I/O policy, the volume server is further configured to send an updated I/O access policy to the first volume client.

3. The system as recited in claim 1,
wherein the first volume client is configured to maintain an encoding of the first I/O access policy in a cache.

4. The system as recited in claim 3,
wherein in response to the reconfiguration command, the volume server is further configured to:
send an invalidation message for the first I/O access policy to the first volume client;
wherein, in response to the invalidation message, the first volume client is further configured to:
invalidate the encoding of the first I/O access policy in the cache.

5. The system as recited in claim 1, wherein each of the first and second I/O access policies includes an access permission.

6. The system as recited in claim 5, wherein the access permission includes one of: a read-only permission, a read-write permission, an exclusive-read permission, and an exclusive-write permission.

7. The system as recited in claim 1, wherein each of the first and second I/O access policies includes one or more of: a direct I/O mode, an indirect I/O mode, and a read-direct-write-indirect I/O mode.

8. The system as recited in claim 7, wherein each of the first and second I/O access policies further includes an access permission.

9. The system as recited in claim 1, wherein the volume server is further configured to change the first and second I/O access policies without taking the logical volume offline.

10. The system as recited in claim 1, wherein each of the first and second I/O policies has a validity period.

11. The system as recited in claim 10,
wherein the first volume client is configured to maintain an encoding of the first I/O access policy in a cache;

wherein the encoding is invalidated upon expiration of the validity period of the first I/O access policy.

12. The system as recited in claim 11, wherein, upon expiration of the validity period of the first I/O access policy, the first volume client is further configured to send an access policy validation request to the volume server, and wherein the volume server is further configured to send a response to the access policy validation request to the first volume client.

13. The system as recited in claim 12, wherein the response to the access policy validation request is a revalidation of the first I/O access policy.

14. A method comprising:
aggregating storage in one or more physical block devices into a logical volume;
making the logical volume accessible to a first volume client using a first I/O access policy;
making the logical volume accessible to a second volume client using a second I/O access policy;
wherein the first I/O access policy differs from the second I/O access policy;
maintaining an entry in a configuration database for each of the first and second volume clients, wherein the entry associates a particular I/O access policy with a given logical volume;
receiving a reconfiguration command;
updating one or more entries in the configuration database;
sending an invalidation message for the first I/O access policy to the first volume client; and
in response to the invalidation message, the first volume client:
placing pending I/O operations to the logical volume in a paused state; and
sending a request for an updated I/O access policy.

15. The method as recited in claim 14, further comprising:
in response to the request for an updated I/O policy, sending an updated I/O access policy to the first volume client.

16. The method as recited in claim 14,
maintaining an encoding of the first I/O access policy in a cache.

17. The method as recited in claim 16,
in response to the reconfiguration command, sending an invalidation message for the first I/O access policy to the first volume client; and
in response to the invalidation message, the first volume client invalidating the encoding of the first I/O access policy in the cache.

18. The method as recited in claim 14, wherein each of the first and second I/O access policies includes an access permission.

19. The method as recited in claim 14, wherein each of the first and second I/O access policies includes one of: a direct I/O mode, an indirect I/O mode, and a read-direct-write-indirect I/O mode.

20. A computer-readable medium comprising program instructions, wherein the program instructions are executable to:
aggregate storage in one or more physical block devices into a logical volume;
make the logical volume accessible to a first volume client using a first I/O access policy;
make the logical volume accessible to a second volume client using a second I/O access policy;
wherein the first I/O access policy differs from the second I/O access policy;
maintain an entry in a configuration database for each of the first and second volume clients, wherein the entry associates a particular I/O access policy with a given logical volume;
receive a reconfiguration command;
update one or more entries in the configuration database; and
send an invalidation message for the first I/O access policy to the first volume client;
wherein, in response to the invalidation message, the program instructions are further executable to cause the first volume client to:
place pending I/O operations to the logical volume in a paused state; and
send a request for an updated I/O access policy.

21. A system comprising:
a volume server;
a first and a second volume client; and
one or more physical block devices;
wherein the volume server is configured to:
aggregate storage in the one or more physical block devices into a logical volume;
make the logical volume accessible to the first volume client using a first I/O access policy;
make the logical volume accessible to the second volume client using a second PO access policy;
wherein the first I/O access policy differs from the second I/O access policy;
wherein the volume server is further configured to maintain an entry in a configuration database for each of the first and second volume clients, wherein the entry associates a particular I/O access policy with a given logical volume;
wherein in response to a reconfiguration command, the volume server is further configured to update one or more entries in the configuration database and send an invalidation message for the first I/O access policy to the first volume client;
wherein the first volume client is configured to maintain an encoding of the first I/O access policy in a cache;
wherein, in response to the invalidation message, the first volume client is further configured to invalidate the encoding of the first I/O access policy in the cache;
wherein, in response to the invalidation message, the first volume client is further configured to place pending I/O operations to the logical volume in a paused state and send a request for an updated I/O access policy to the volume server.

22. The system as recited in claim 21,
wherein in response to the request for an updated I/O policy, the volume server is further configured to send an updated I/O access policy to the first volume client; and
wherein, in response to receiving the updated I/O access policy, the first volume client is further configured to:
insert an encoding of the updated I/O access policy in the cache;
resume a first subset of the pending I/O operations allowed under the updated I/O access policy; and
abandon a second subset of the pending I/O operations disallowed under the updated I/O access policy.

23. A system comprising:
a volume server;
a first and a second volume client; and
one or more physical block devices;

wherein the volume server is configured to:
  aggregate storage in the one or more physical block devices into a logical volume;
  make the logical volume accessible to the first volume client using a first I/O access policy;
  make the logical volume accessible to the second volume client using a second I/O access policy;
wherein the first I/O access policy differs from the second I/O access policy;
wherein the volume server is further configured to maintain an entry in a configuration database for each of the first and second volume clients, wherein the entry associates a particular I/O access policy with a given logical volume;
wherein in response to a reconfiguration command, the volume server is further configured to update one or more entries in the configuration database and send an invalidation message for the first I/O access policy to the first volume client;
wherein each of the first and second I/O policies has a validity period;
wherein the first volume client is configured to maintain an encoding of the first I/O access policy in a cache;
wherein the encoding is invalidated upon expiration of the validity period of the first I/O access policy;
wherein, upon expiration of the validity period of the first I/O access policy, the first volume client is further configured to send an access policy validation request to the volume server, and wherein the volume server is further configured to send a response to the access policy validation request to the first volume client;
wherein the response to the access policy validation request is an updated I/O access policy, wherein the first volume client is further configured to abandon a subset of pending I/O operations to the logical volume disallowed under the updated policy.

* * * * *

UNITED STATES PATENT AND TRADEMARK OFFICE
CERTIFICATE OF CORRECTION

| | | |
|---|---|---|
| PATENT NO. | : 7,328,287 B1 | Page 1 of 1 |
| APPLICATION NO. | : 10/899201 | |
| DATED | : February 5, 2008 | |
| INVENTOR(S) | : Kalaivani Arumugham et al. | |

It is certified that error appears in the above-identified patent and that said Letters Patent is hereby corrected as shown below:

In the Claims:

Claim 21, col. 18, line 26, please change "PO" to --I/O--.

Signed and Sealed this

Fourteenth Day of October, 2008

JON W. DUDAS
*Director of the United States Patent and Trademark Office*